UNITED STATES PATENT OFFICE.

JOHN JOHANN, OF HARRISON, WISCONSIN.

COMPOSITION FOR TREATING SEEDS.

SPECIFICATION forming part of Letters Patent No. 449,741, dated April 7, 1891.

Application filed December 20, 1889. Serial No. 334,430. (No specimens.)

*To all whom it may concern:*

Be it known that I, JOHN JOHANN, a citizen of the United States, residing at Harrison, in the county of Calumet and State of Wisconsin, have invented a new and useful improvement in a chemical solution in which grain-seeds of various kinds—such as wheat, rye, oats, barley, &c.—may be soaked before sowing the same, for the purpose of preventing the ravages of insects upon the crop of said grain during its growth, and also for providing the seed with a chemical solution which can be absorbed by it and making it thereby better adapted to withstand severe droughts, giving to the grain-seeds also an accelerated growth, some of said chemicals having moisture-attracting elements, while another gives to the seed a strengthening and growing impetus.

Seeds prepared as hereinafter described have been found to be protected from the ravages of the chinch-bug and good crops insured therefrom in fields, while other fields alongside thereof the seeds of which were not so prepared have been entirely destroyed by them. An accelerated growth is given to the grain, and the chinch-bug after once trying leaves the grain for other food that is more palatable.

The following I do hereby declare to be a full, clear, and exact description of my invention, such as will enable others to make and use the same.

My invention relates to an improved solution and to the process of preparing, compounding, manufacturing, and using the same; and it consists, essentially, of the elements, proportions, preparation, and application thereof, as will hereinafter appear.

It consists of a solution of chemicals dissolved in water, which is poured upon or into which the grain-seeds are placed and thoroughly saturated by said solution, and is prepared and applied to the grain-seeds as follows:

For the preparation of fifteen bushels of grain-seed of any of the grains, such as wheat, rye, oats, barley, or any other seeds which it may be desired to protect from the ravages of insects, I take the following, the chemicals being the common articles of commerce: one pound of saltpeter, three pounds of salt, one-half pound blue vitriol, and water sufficient to dissolve. After the chemicals are entirely dissolved add six pails, or about fifteen gallons, of water. Thoroughly saturate the seed with the above solution by pouring it upon or placing the seed therein, (if the former, the seed should be formed into a pile,) letting it remain thus about twelve hours. If the seed is to be sown by hand, it is now ready for use; but if to be used in a seeding-machine, or it is to be kept for any length of time unused, it should be thoroughly dried. After drying it may be kept for any length of time, as a few weeks or months, without a sensible depreciation of the qualities of its chemical elements. If the seed is sown in a damp condition, a greater measure of seeds should be sown to allow for the increase in their bulk incident to their being soaked in said solution. Under some conditions as regards richness and moisture of the soil in which the grain-seeds are to be sown the composition of the above solution may be changed.

The primary object of the saltpeter is to protect the seed and the root of the growing grain from the ravages of insects, and especially of the chinch-bug, that of the salt to attract moisture to the seeds and the roots of the growing grain and to supply to such soil as is wanting in the elements of the salt its saline qualities, and that of the blue vitriol to give to the seed in soils of low vitality, those lacking the elements necessary to the rapid growth of the seeds, an early and rapid growth. It will be evident, therefore, that the above combination will not be required under both of the above-named conditions of the soil. Only the saltpeter and water will be needed in forming the solution for the seeds to be sown upon sufficiently rich and moist land for the protection of said seeds against insect depredations, while but one of the remaining chemicals needs to be used with the saltpeter in forming the solution, unless a want of both moisture and richness of the soil so demands.

The omission of one or more of the above-named chemicals from the combination which forms the solution does not affect the method of preparing or using said solution. I may therefore vary the component parts of this solution or the proportions of said parts to meet the varying condition of soil; but for most soils the first-named combination and the proportions named therein will be found adapted.

Having described my invention and the manner of compounding and using the same, what I claim, and desire to secure by Letters Patent, is—

1. The herein-described composition of matter, substantially in the proportions specified, to be used with water for forming a solution for treating seeds, as described, for preventing the destruction by insects of the crops of grain grown therefrom, consisting of saltpeter and salt, with or without blue vitriol, substantially as described.

2. The herein-described composition of matter for combination with water and the formation of a solution to be used upon grain-seeds before sowing the same for preventing the destruction by insects of the crops of grain grown therefrom, consisting of saltpeter and blue vitriol, substantially in the proportions specified.

JOHN JOHANN.

Witnesses:
HARRY DE WOLF,
L. J. PINKERTON.